May 31, 1966 E. F. HILL 3,254,200
ELECTRICAL RESISTANCE HOT AIR BASEBOARD TYPE HEATER
Filed Sept. 13, 1962
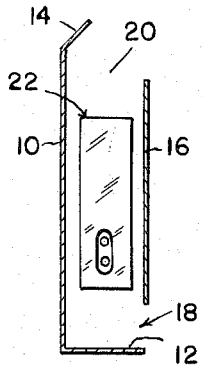
FIG.2.
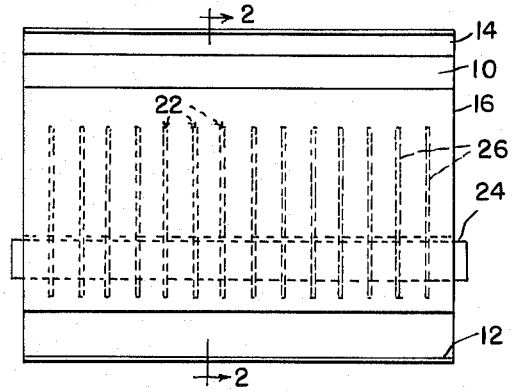
FIG.1.
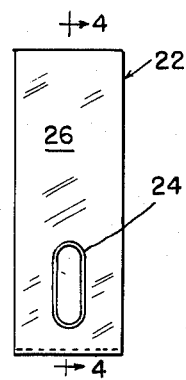
FIG.3.
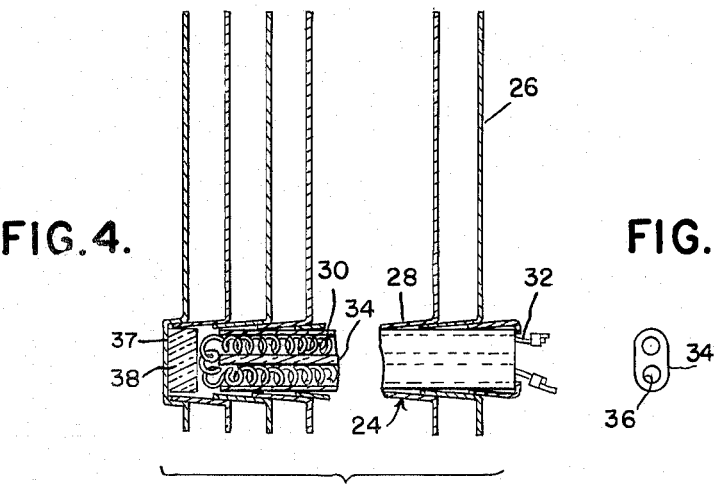
FIG.4.
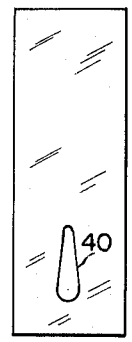
FIG.5.
FIG.6.
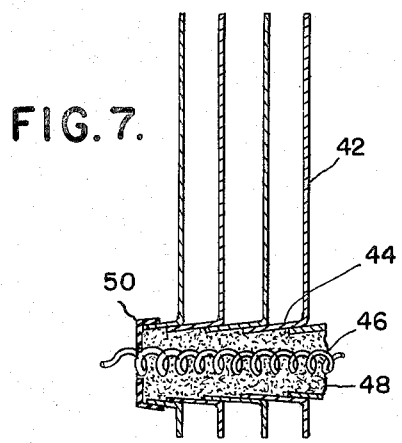
FIG.7.
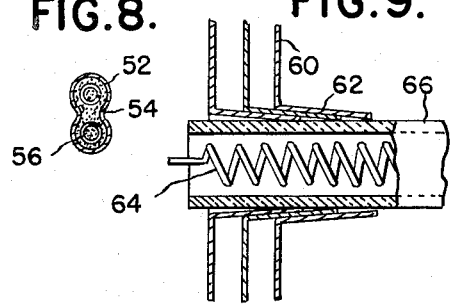
FIG.8. FIG.9.
INVENTOR.
EUGENE F. HILL
BY Whittemore,
Hulbert + Belknap
ATTORNEYS

United States Patent Office 3,254,200
Patented May 31, 1966

3,254,200
ELECTRICAL RESISTANCE HOT AIR BASEBOARD TYPE HEATER
Eugene F. Hill, Southfield, Mich., assignor to Calumet & Hecla, Inc., Allen Park, Mich., a corporation of Michigan
Filed Sept. 13, 1962, Ser. No. 223,489
9 Claims. (Cl. 219—365)

The present invention relates to an electrical resistance hot air baseboard type heater and more particularly, to the heating element thereof.

It is an object of the present invention to provide a baseboard heater comprising an elongated casing having spaced front and rear walls provided with an air inlet opening at the bottom and an air discharge opening at the top, and including a heating unit in the form of a metal finned tube having an electrical resistance element therein.

It is a further object of the present invention to provide a heating unit for a baseboard type hot air heater comprising a metal finned tube, an electrical resistance element in the tube, and insulating means separating the resistance element from the tube.

It is a further object of the present invention to provide a heating unit of the character described comprising a finned tube made up of a plurality of plates each of which has an intermediate opening and a tapered tubular collar portion surrounding the opening, the tapered tubes of said plates being assembled together to form a continuous tubular element and being permanently bonded together, an electrical resistance element within said tubular element, and means insulating said resistance element from said tubular element.

It is a further object of the present invention to provide a heating unit as described in the preceding paragraph in which the means insulating the resistance element from the tubular element comprises a ceramic or vitreous tubular insulator.

It is a further object of the present invention to provide a heating unit as described in the preceding paragraph in which the means insulating the resistance element from the tubular element comprises a powdered insulating material such for example as magnesium oxide.

It is a further object of the present invention to provide a heating unit as described in the preceding paragraph in which the powdered insulating material is compacted by ultrasonic vibration.

It is a further object of the present invention to provide a heating unit as described in the second paragraph above in which the powdered insulating material is compacted by displacing the sides of the tubular element inwardly.

It is a further object of the present invention to provide a heating unit in the form of a metal finned tube in which the fins are vertically elongated and in which the center line of the tube is spaced above the bottom edges of the fins by a dimension equal to .2 to .4 of the vertical height of the fins.

It is a further object of the present invention to provide a heating unit comprising a metal finned tube having generally rectangular vertially elongated fins whose dimensions are approximately 1 inch in width and between 2¾ and 3¼ inches in height, and which are separated apart to provide between three and four fins per inch.

It is a further object of the present invention to provide a heating unit as described in either of the two preceding paragraphs in which the tube is vertically elongated and is preferably of tear-drop cross-sectional shape to facilitate a convection flow of air upwardly between the fins.

It is a further object of the present invention to provide a heating unit as defined in any of the last three paragraphs in which the metal of the finned tube is predominantly aluminum.

Other objects and features of the invention will become apparent as the description proceeds, especially when taken in conjunction with the accompanying drawings, illustrating preferred embodiments of the invention, wherein:

FIGURE 1 is a front elevational view of a baseboard electric heater.

FIGURE 2 is a section on the line 2—2, FIGURE 1.

FIGURE 3 is an enlarged end view of the heating unit employed within the baseboard heater.

FIGURE 4 is a section on the line 4—4, FIGURE 3

FIGURE 5 is an end view of the insulator employed in the assembly shown in FIGURE 4.

FIGURE 6 is an end view of a heating unit representing another embodiment of the present invention.

FIGURE 7 is a fragmentary sectional view through a heating unit representing yet another embodiment of the present invention.

FIGURE 8 is a transverse section through a tube of a heating element illustrating a specially compacted powdered insulating material therein.

FIGURE 9 is a fragmentary longitudinal sectional view through a heating unit representing yet another embodiment of the present invention.

The heating of homes electrically offers many obvious advantages over other types of heating and the most satisfactory type of electric home heating is the so-called baseboard type heating in which the heating unit is vertically elongated and occupies the space along the bottom of the walls normally occupied by a conventional baseboard. In order that this heating structure shall occupy a minimum of space, it is of course desirable that the unit be of minimum thickness. Furthermore, it is essential that the flow of air through the unit shall be by convection and that the unit be arranged so that the convection flow of air be such as to maintain portions of the casing below maximum safe or desirable operating temperatures.

Essentially, the heating unit comprises a casing having a rear wall 10 provided with a forwardly extending portion 12 forming a bottom wall and a forwardly inclined upper portion 14 which serves to direct the upward convection flow of heated air away from the wall and into the interior of the room being heated. The casing includes a front wall 16 which is supported from the back wall at intervals by suitable means (not illustrated herein). The lower edge of the front wall 16 is spaced above the bottom wall 12 to provide an air inlet opening 18 and the upper edge of the front wall 16 is spaced below and forwardly from the front edge of the inclined wall 14 as illustrated, to provide an outlet opening 20 for the heated air. Within the casing there is provided an elongated heating unit indicated generally at 22 and which is shown in detail and in various forms in FIGURES 3–9.

Described in general terms the heating unit as illustrated in FIGURES 3 and 4, comprises a finned tube construction including a tube 24 provided with a multiplicity of integral fins 26. The fins 26 are in efficient heat conducting relationship with respect to the tube 24 and an electrical resistance heating element is contained within the tube 24 and is suitably electrically insulated therefrom.

Inasmuch as efficient heat transfer to air within the room requires a substantial convection flow of air through the heater, it is desirable to design the heating unit so as to offer a minimum resistance to flow and so as to so channel the heated air as to promote and control the upward flow of air by convection through the casing and discharge of air into the room. For this reason the fins 26 are vertically elongated to provide a multiplicity of convection spaces or chimneys through which the air flows. Investigation has shown that a substantial improvement in overall efficiency is obtained by forming the tubes 24 of a vertically elongated cross-section so that the tubes themselves offer a minimum resistance to the convection flow of air. Moreover, it has been found that the most efficient heat transfer to the flowing air occurs when the tubes are located in the lower portion of the fin. Best results have been obtained by so locating the tube 24 relative to the fins 26 that the center line of the tube is spaced upwardly from the lower edge of the fin by a dimension which is equal to .2 to .4 of the total fin height.

In accordance with the present invention the fins 26 are initially provided in the form of flat metal plates cut to the required size and shape and provided with vertically elongated openings therein, each of the openings being surrounded by a laterally extending tapered tubular portion or collar 28. The taper of the tubular portions 28 is selected such that when the outer reduced free end of each tubular portion 28 is inserted through the opening into the tubular portion of an adjacent plate or fin 26 and into contact therewith, the individual fins 26 are properly spaced. In order to promote most efficient heat transfer from the heating element contained within the tube 24, it is of course essential that the overlapped portions of the collars 28 shall be in good heat conducting contact. Moreover, it is a requirement that the components making up a single finned tube shall be free of rattles or movement relative to each other which might be the source of a noise. These results are accomplished by providing for a bonding of the overlapped surfaces of the tubular portions or collars 28, such for example by brazing, welding, or the like. As thus assembled, the collars constitute the tube 24.

As best seen in FIGURE 4, the source of heat for the heating unit is an electrical resistance heating element 30 illustrated as in the form of a coiled resistance wire. In the form of the invention illustrated in FIGURE 4 this wire extends from one end of the elongated heating unit substantially to the other end thereof and return so that the two ends of the heating element as indicated at 32, project from the end of the heating unit. This facilitates connection of the electrical resistance heating element 30 to a source of electrical current.

It is of course essential for the electrical resistance heating element to be insulated from the metal tube 24. This may be accomplished by enclosing the electrical resistance heating element 30 within a ceramic or vitreous insulator such as illustrated at 34. This insulator is shown as provided with two longitudinally extending openings 36, and the electrical resistance heating element extends longitudinally through one of the openings 36 and returns through the other. Contact between the electrical resistance heating element 30 at the closed end 37 of the tube 24 is prevented by means of an insulating block 38.

Referring now to FIGURE 6 there is shown a similar heating unit which differs from that previously described only in that the tube 40 is provided with a tear-drop cross-sectional shape for the purpose of providing a minimum impedance to the convection flow of air through the unit. The finned tube of the type described herein is characterized in its capability of having the tubular portion thereof of any particular desired cross-section, due to the method of fabrication.

Referring now to FIGURE 7 there is illustrated a modification of the present invention in which the finned tubular construction comprising the fins 42 and the tube 44 is provided with an electrical resistance heating element 46 in the form of a coiled wire which is insulated from the metal of the tube 44 by means of a compacted powdered insulating material 48 which may for example, be magnesium oxide or an equivalent material. In this figure the electrical resistance heating element is shown as comprising a single length although it could of course be doubled as indicated in FIGURE 4, the adjacent lengths of convolutions being insulated by an interposed insulating sheet. In FIGURE 7 an end of the electrical resistance heating element 46 is shown as extending outwardly through a central opening in an insulating cap 50.

It is desirable for the powdered insulating material 48 to be in a compacted condition and this may be accomplished by filling the tube with powdered material surrounding the coiled conductor, and ultrasonically vibrating the finned tube to cause the powdered material to settle and become compacted.

An alternative method of providing a single or multiple run of coiled electrical conductor within a compacted insulating powder within the tube of the finned tube construction is illustrated in FIGURE 8. In this construction the vertically elongated tube of the type illustrated at 24 in FIGURE 3 is provided with the coiled electrical resistance heating element and the powder, and thereafter the opposite flat side walls of the tube 52 are displaced inwardly as indicated at 54 to compact the powder around the coiled electrical resistance heating element 56.

A somewhat different embodiment of the invention is illustrated in FIGURE 9 where the fined tube is illustrated as comprising fins 60 and tapered tubular collars 62 overlapped to a greater extent than in the previous embodiments to provide increased heat transfer contact between portions of the collars. In this case the electrical resistance heating element is indicated at 64 and is shown as insulated from the metal of the finned tube by means of a ceramic or vitreous insulating tube 66.

For reasons of space economy it is desirable to limit the width of the fins, such as the fins 26, 42 and the like, to a width of 1 inch. It has been found that the most efficient flow of air with resultant transfer of heat to the air and resultant prevention of excessive temperatures of portions of the baseboard heater occurs when the height of the fins is maintained between 2¾ and 3¼ inches. It has further been determined that the most efficient heat transfer relationship exists when the spacing of the fins is between three and four fins per inch. Finally, it has been found that the most efficient results are obtained when the tube which contains the electrical resistance heating element is located in the lower half of the fins and particularly, where the center line of the tube is located above the bottom edge of the fins by a dimension which is equal to .2 to .4 of the overall height of the fins. It has further been determined that the most efficient flow of air through the heater is obtained when the bottom edges of the fins 26 or 42 are located above the lower edge of the front wall 16 of the casing.

While the elongated heating element may employ a finned tube constructed by any known method, the herein illustrated finned tube composed of a multiplicity of assembled apertured plates, provides for the simplest and most economical production of finned tubing having the required dimensions and shape of fin and tube portions. The metal of the finned tube may be any metal which lends itself to the economical production of the finned tube. Copper and aluminum appear to be the metals which best lend themselves to easy fabrication and which are most efficient in use. However, when the finned tube is formed of aluminum, a surprising increase in overall efficiency has been observed, apparently due to the reduced drag of the aluminum surface to the air as opposed to the drag offered by the copper surface.

The drawings and the foregoing specification constitute a description of the improved electrical resistance hot air baseboard type heater in such full, clear, concise and exact terms as to enable any person skilled in the art to practice the invention, the scope of which is indicated by the appended claims.

What I claim as my invention is:

1. A baseboard heater comprising an elongated, horizontally extending casing having an upright outer front wall and a rear wall in substantially parallel and laterally spaced relation to one another, and an elongated heating unit disposed within and extending substantially horizontally of said casing between and in laterally spaced relation to said walls of the latter, the rear wall being provided with means affording a bottom wall of the casing, and being provided along its upper edge with an upwardly and forwardly inclined deflector portion, the front wall being substantially flat and imperforate, having its lower edge facing downward and spaced vertically above said casing bottom wall to provide an air inlet opening, and having its upper edge facing upward and spaced below and forwardly from the forward edge of the inclined deflector portion of said rear wall to provide an outlet opening for air, said heating unit being directly exposed forwardly to said casing front wall and being entirely above said inlet opening, the heating unit comprising a series of upright, laterally spaced, substantially parallel and horizontally aligned fins, said fins being provided adjacent their lower ends with horizontally aligned, vertically elongated openings and being formed about said elongated openings to provide laterally projecting tapered tubular portions, said tubular portions being assembled together with the free end of each tubular portion fitting in nested relation within an adjacent tubular portion, said nested tubular portions being secured together in surface-to-surface relation and forming a continuous tube, an electrical resistance heating element disposed within and extending lengthwise of said continuous tube, and electrical insulating means within said tube and surrounding said electrical resistance heating element to insulate said heating element from said tube.

2. The baseboard heater as defined in claim 1, wherein the electrical resistance heating element has two vertically spaced substantially parallel lengths thereof within and extending substantially from one end to the other of said continuous tube, and has adjacent one end of said tube an upright portion connecting said lengths, and has terminal portions projecting endwise from said lengths at the other end of said tube.

3. The baseboard heater as defined in claim 1, wherein portions of opposite side walls of said tube are displaced inwardly to compact the insulating material around the two substantially parallel lengths of the electrical resistance heating element.

4. The baseboard heater as defined in claim 1, wherein the continuous tube has a tear-drop cross-sectional configuration to provide a minimum resistance to the flow of air from the air inlet opening to the air outlet opening.

5. The baseboard heater as defined in claim 1, wherein the insulating means is in the form of a shaped form sustaining body.

6. The baseboard heater as defined in claim 1, wherein the width of each of said upright fins is approximately one inch, the height of each of said upright fins is approximately three inches, approximately three spaced apart upright fins are within one linear inch, and the longitudinal center line of the tube is located above the lower ends of said fins a distance substantially equal to three-tenths of the height of said fins.

7. The baseboard heater as defined in claim 1, wherein the insulating means comprises compacted powdered material.

8. The baseboard heater as defined in claim 1, wherein the insulating means comprises compacted magnesium oxide.

9. A baseboard heater as defined in claim 1 in which said rear wall of said casing comprises a one-piece member having an integral forwardly extending portion adjacent the bottom thereof providing said casing bottom wall.

References Cited by the Examiner

UNITED STATES PATENTS

| | | | |
|---|---|---|---|
| 1,731,472 | 10/1929 | Murray | 219—342 X |
| 1,771,752 | 7/1930 | Fischer | 219—342 |
| 1,823,067 | 9/1931 | Smalley | 219—540 |
| 1,956,617 | 5/1934 | Jaffe | 165—182 X |
| 2,452,875 | 11/1948 | Shannon | 219—365 |
| 2,683,209 | 7/1954 | Beckjord | 219—368 |
| 2,853,765 | 9/1958 | Wemhoener | 29—155.65 |
| 2,861,167 | 11/1958 | Wick | 219—365 |
| 3,071,748 | 1/1963 | Lucia | 338—268 |

FOREIGN PATENTS 629,253 9/1949 Great Britain.
251,324 8/1948 Switzerland.

RICHARD M. WOOD, *Primary Examiner.*

ANTHONY BARTIS, *Examiner.*